United States Patent
Lin et al.

(10) Patent No.: US 10,628,652 B2
(45) Date of Patent: Apr. 21, 2020

(54) SENSING METHOD OF FINGERPRINT SENSOR

(71) Applicant: Au Optronics Corporation, Hsinchu (TW)

(72) Inventors: Wu-Wei Lin, Taoyuan (TW); Jui-Chi Lo, Taoyuan (TW)

(73) Assignee: Au Optronics Corporation, Hsinchu (TW)

( * ) Notice: Subject to any disclaimer, the term of this patent is extended or adjusted under 35 U.S.C. 154(b) by 379 days.

(21) Appl. No.: 15/795,261

(22) Filed: Oct. 27, 2017

(65) Prior Publication Data
US 2019/0042821 A1 Feb. 7, 2019

(30) Foreign Application Priority Data
Aug. 3, 2017 (TW) .............................. 106126161 A

(51) Int. Cl.
*G06K 9/00* (2006.01)

(52) U.S. Cl.
CPC ................................. *G06K 9/0002* (2013.01)

(58) Field of Classification Search
CPC ..... G06F 3/044; G06F 1/3262; G06K 9/0002; G01D 5/24; G01D 5/241; G01R 27/2605; H03K 17/962
See application file for complete search history.

(56) References Cited

U.S. PATENT DOCUMENTS

| 2016/0259474 A1* | 9/2016 | King ..................... G06F 3/0416 |
| 2016/0314333 A1 | 10/2016 | Chiang et al. |
| 2017/0090619 A1* | 3/2017 | Yousefpor ............... G06F 3/044 |

FOREIGN PATENT DOCUMENTS

| CN | 106201140 | 12/2016 |
| CN | 106371681 | 2/2017 |
| TW | I541731 | 7/2016 |

* cited by examiner

*Primary Examiner* — Kim Y Vu
*Assistant Examiner* — Michael J Vanchy, Jr.
(74) *Attorney, Agent, or Firm* — JCIPRNET

(57) ABSTRACT

A sensing method of a fingerprint sensor is provided. The fingerprint sensor includes a plurality of sensing pixels arranged in an array, and the sensing pixels respectively have a sensing electrode. The sensing method includes following steps. A required resolution of an identification requirement is determined; here, the identification requirement is received by the fingerprint sensor. If the number of pixels of the required resolution is less than or equal to the number of the sensing pixels, self-capacitance sensing is performed on the sensing pixels to provide a first fingerprint pattern. If the number of pixels of the required resolution is greater than the number of the sensing pixels, the self-capacitance sensing and mutual capacitance sensing are performed on the sensing pixels to provide a second fingerprint pattern.

11 Claims, 14 Drawing Sheets

SENSING METHOD OF FINGERPRINT SENSOR

CROSS-REFERENCE TO RELATED APPLICATION

This application claims the priority benefit of Taiwan application serial no. 106126161, filed on Aug. 3, 2017. The entirety of the above-mentioned patent application is hereby incorporated by reference herein and made a part of this specification.

FIELD OF THE DISCLOSURE

The disclosure relates to a sensing method and more particularly relates to a sensing method of a fingerprint sensor.

DESCRIPTION OF RELATED ART

A fingerprint sensor requires a certain level of resolution, whereby the area occupied by a sensing PAD is limited, and capacitances sensed by fingers are less accordingly. As such, it is difficult to determine and process the sensed capacitances. The area of the sensing electrode may be further reduced since an active fingerprint sensor is required to provide radio frequency signals.

In the conventional fingerprint sensor, the need to increase the area of the sensing (receiving) electrode may result in the compromise that the area of the transmission electrode is far smaller than the area of the sensing (receiving) electrode, and thus the transmission impedance is large. The radiation intensity of the signals is also diminished, which leads to the reduction of the signal penetration. In another aspect, the increased number of steps in a manufacturing process may allow the transmission electrode and the sensing electrode to be in different metal layers, and the increased area enables the transmission intensity to increase. However, manufacturing costs are also increased together with the increased number of steps in the manufacturing process.

SUMMARY OF THE DISCLOSURE

The disclosure provides a sensing method of a fingerprint sensor to increase scan resolution of the fingerprint sensor through self-capacitance sensing and mutual capacitance sensing. In the method, according to the required resolution of an identification requirement, it can be determined to perform the self-capacitance sensing on sensing pixels of the fingerprint sensor or perform the self-capacitance sensing and the mutual capacitance sensing sequentially.

A sensing method of a fingerprint sensor is provided. The fingerprint sensor includes a plurality of sensing pixels arranged in an array, and the sensing pixels respectively have a sensing electrode. The sensing method includes following steps. A required resolution of an identification requirement is determined; here, the identification requirement is received by the fingerprint sensor. If the number of pixels of the required resolution is less than or equal to the number of the sensing pixels, self-capacitance sensing is performed on the sensing pixels to provide a first fingerprint pattern. If the number of pixels of the required resolution is greater than the number of the sensing pixels, the self-capacitance sensing and mutual capacitance sensing are performed on the sensing pixels to provide a second fingerprint pattern.

In view of the above, in the sensing method of the fingerprint sensor provided in the embodiments of the disclosure, whether to perform the self-capacitance sensing on sensing pixels of the fingerprint sensor or perform the self-capacitance sensing and the mutual capacitance sensing sequentially may be determined according to the required resolution of an identification requirement, so as to adjust the scan time of the fingerprint sensor according to the identification requirement. Thereby, the identification requirement may be satisfied, and the scan time and the power consumption of the fingerprint sensor may be reduced. Furthermore, combining the self-capacitance sensing and the mutual capacitance sensing allows the increase in the area of the sensing pixels. The larger the area of the sensing pixels, the more sensitive of the sensing, and the greater the intensity of receiving signals.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
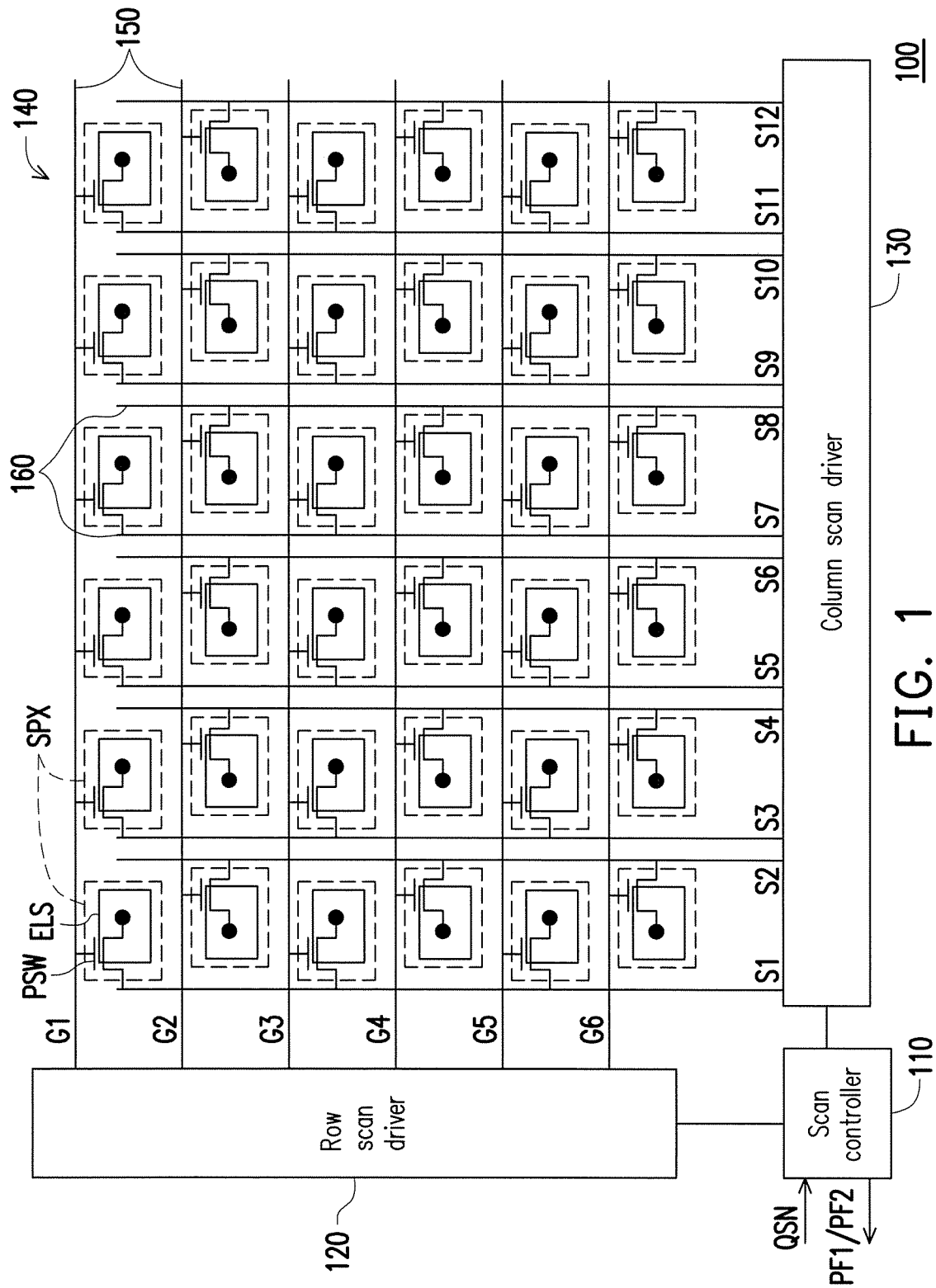
FIG. 1 is a schematic view illustrating a system of a fingerprint sensor according to an embodiment of the disclosure.

FIG. 1 is a schematic view illustrating a system of a fingerprint sensor according to an embodiment of the disclosure. With reference to FIG. 1, in the present embodiment, the fingerprint sensor 100 includes a scan controller 110, a row scan driver 120, a column scan driver 130, a sensing pixel array 140, a plurality of gate lines 150, and a plurality of source lines 160. The sensing pixel array 140 includes a plurality of sensing pixels SPX arranged in an array, e.g., a 6×6 sensing pixel array; however, the disclosure should not be limited thereto. Each of the sensing pixels SPX has a switch transistor PSW and a sensing electrode ELS. A gate of the switch transistor PSW is coupled to the corresponding gate line 150, a drain of the switch transistor PSW is coupled to the corresponding source line 160, and a source of the switch transistor PSW is coupled to the sensing electrode ELS. If the sensing pixel array 140 is observed from its upper-left corner as the reference point, the source lines 160 coupled to the sensing pixels SPX in odd-numbered rows are different from the source lines 160 coupled to the sensing pixels SPX in even-numbered rows.

The row scan driver 120 is coupled to the scan controller 110 and the gate lines 150, so as to be controlled by the scan controller 110 and provide a plurality of gate signals G1-G6 to the gate lines 150. The column scan driver 130 is coupled to the scan controller 110 and the source lines 160, so as to be controlled by the scan controller 110 and set a plurality of source signals S1-S12 on the source lines 160 or receive the source signals S1-S12 on the source lines 160 affected by the sensing electrodes ELS.

In the present embodiment, the scan controller 110 receives an external identification requirement QSN and then determines a required resolution of the identification requirement QSN. If the number of pixels of the required resolution of the identification requirement QSN is less than or equal to the number of the sensing pixels SPX, the scan controller 110 performs self-capacitance sensing on all the sensing pixels SPX through the row scan driver 120 and the column scan driver 130, so as to provide a first fingerprint pattern PF1. At this time, the scan resolution of the first fingerprint pattern PF1 is equal to the number of all of the sensing pixels SPX.

If the number of pixels of the required resolution of the identification requirement QSN is greater than the number of all sensing pixels SPX, the self-capacitance sensing and mutual capacitance sensing are performed sequentially on all the sensing pixels SPX to provide a second fingerprint pattern PF2. At this time, the scan resolution of the second fingerprint pattern PF2 is greater than the number of all of the sensing pixels SPX.

In view of the above, in the fingerprint sensor 100, the self-capacitance sensing may be performed on the sensing pixels SPX in response to the required resolution of the identification requirement QSN, or the self-capacitance sensing and the mutual capacitance sensing are sequentially performed in response to the required resolution of the identification requirement QSN. Thereby, the scan time and the power consumption of the fingerprint sensor 100 can be reduced while the identification requirement is satisfied.

Figure 2:
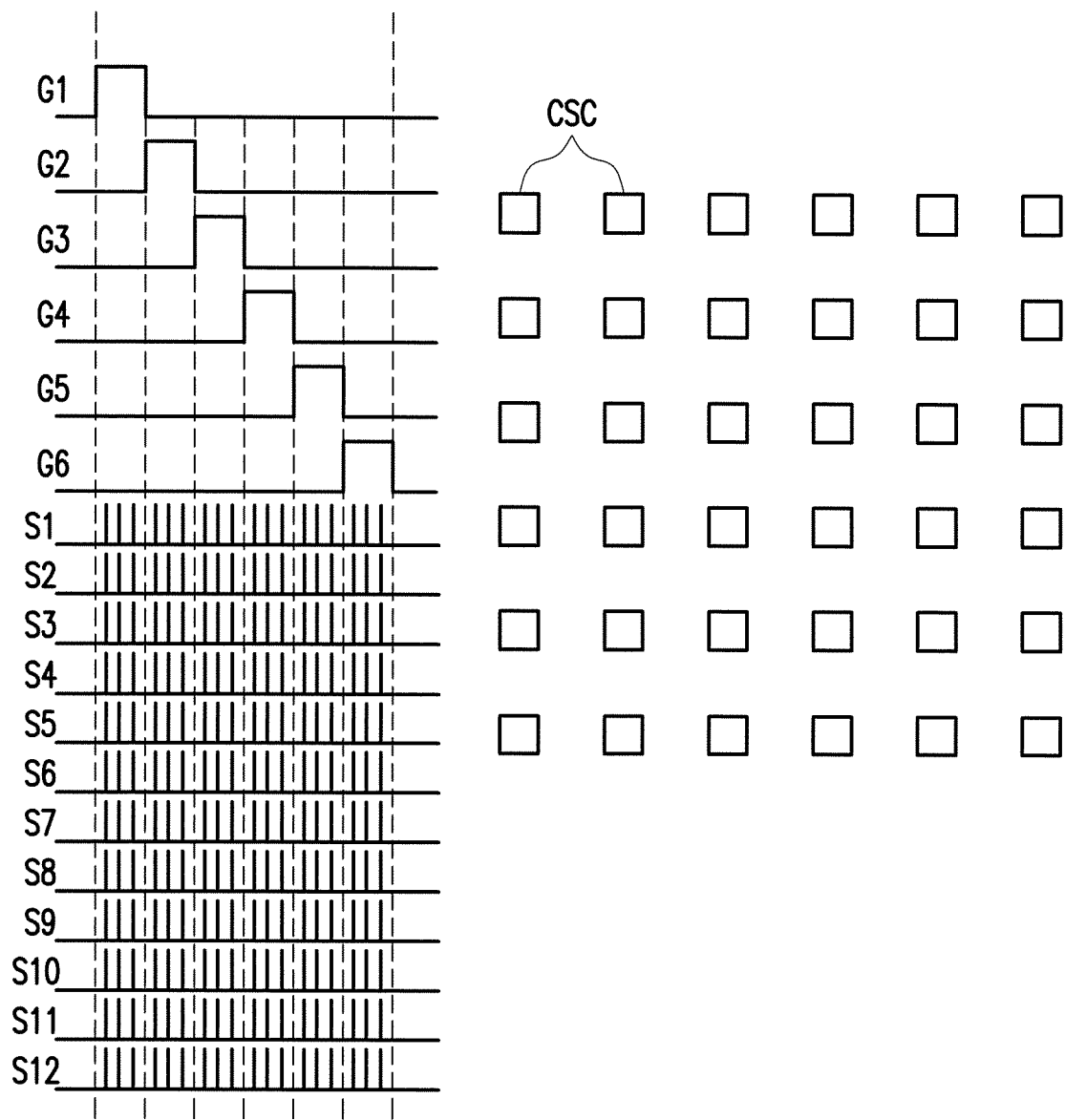
FIG. 2 is a schematic view illustrating self-capacitance sensing by a fingerprint sensor according to an embodiment of the disclosure.

FIG. 2 is a schematic view illustrating self-capacitance sensing by a fingerprint sensor according to an embodiment of the disclosure. With reference to FIG. 1 and FIG. 2, in this embodiment, the self-capacitance sensing performed by the fingerprint sensor 100 includes following steps. The row scan driver 120 provides the gate signals G1-G6 that are sequentially enabled, so as to turn on all the sensing pixels SPX row by row. The column scan driver 130 performs the self-capacitance sensing on the sensing electrodes of the turned-on sensing pixels SPX (the driving pulses are provided before the sensing is performed), so as to obtain the self-capacitances CSC of the sensing pixels SPX (as shown by the solid blocks on the right of FIG. 2).

Here, the self-capacitances CSC (shown by the solid blocks) of the sensing pixels SPX correspond to the locations of the sensing pixels SPX, and the self-capacitances CSC of all the sensing pixels SPX may serve as the first fingerprint pattern PF1.

In an embodiment of the disclosure, the mutual capacitance sensing is performed in two mutual capacitance sensing periods according to the definition of the transmission electrode pixels. Steps performed in the first mutual capacitance sensing period are described below with reference to FIG. 3A to FIG. 3F, and steps performed in the second mutual capacitance sensing period are described below with reference to FIG. 4A to FIG. 4D.

Figure 3A:
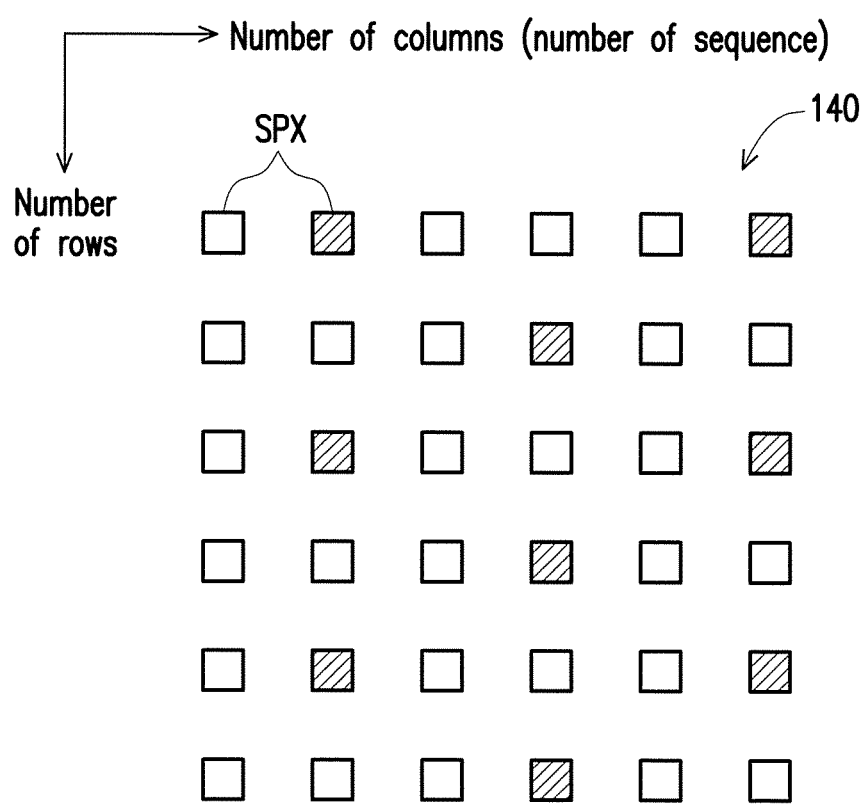
FIG. 3A to FIG. 3F are schematic views illustrating mutual capacitance sensing by a fingerprint sensor in a first mutual capacitance sensing period.

FIG. 3A to FIG. 3F are schematic views illustrating the mutual capacitance sensing by a fingerprint sensor in the first mutual capacitance sensing period. With reference to FIG. 1 and FIG. 3A, in the present embodiment, the sensing pixel array 140 is observed from its upper-left corner as the reference point, and the second and the sixth sensing pixels SPX in odd-numbered rows and the fourth sensing pixels SPX in even-numbered rows (corresponding to the first part) are defined as the first transmission electrode pixels (as shown by blocks filled with diagonal lines). Broadly speaking, the $(2+4 \times n)^{th}$ sensing pixels in odd-numbered rows and the $(4+4 \times n)^{th}$ sensing pixels in even-numbered rows serve as the first transmission electrode pixels, and n is an integer greater than or equal to zero.

Figure 3B:
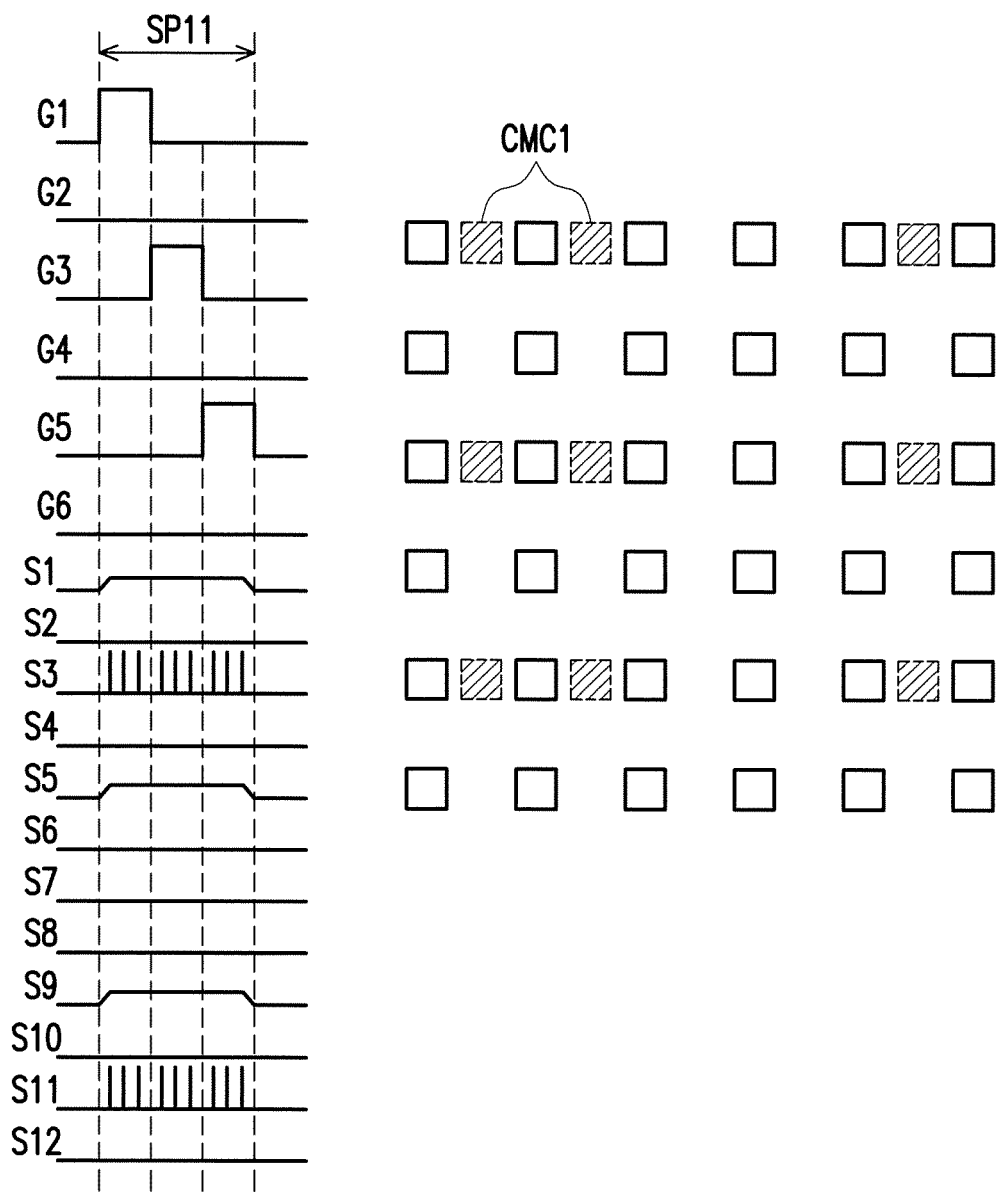

With reference to FIG. 1 and FIG. 3B, in a first sub-sensing period SP11 of the first mutual capacitance sensing period, the odd-numbered gate signals G1, G3, and G5 that are sequentially enabled are provided by the row scan driver 120, so as to turn on the sensing pixels SPX row by row in odd-numbered rows. Driving pulses (i.e., driving signals) are formed on the source signals S3 and S11 by the column scan driver 130, so as to feed the driving signals in the turned-on first transmission electrode pixels. Here, the source signals S3 and S11 are received by the turned-on first transmission electrode pixels, i.e., the $(2+4 \times n)^{th}$ sensing pixels in the odd-numbered rows. The column scan driver 130 receives the source signals S1, S5, and S9, so as to obtain parts of first mutual capacitances CMC1 (as shown by the dotted blocks filled with diagonal lines on the right of FIG. 3B) from the sensing pixels SPX that are directly adjacent to the first transmission electrode pixels and located in odd-numbered rows. That is, the mutual capacitances of the driven first transmission electrode pixels and the sensing pixels SPX in the horizontal direction are obtained.

Figure 3C:
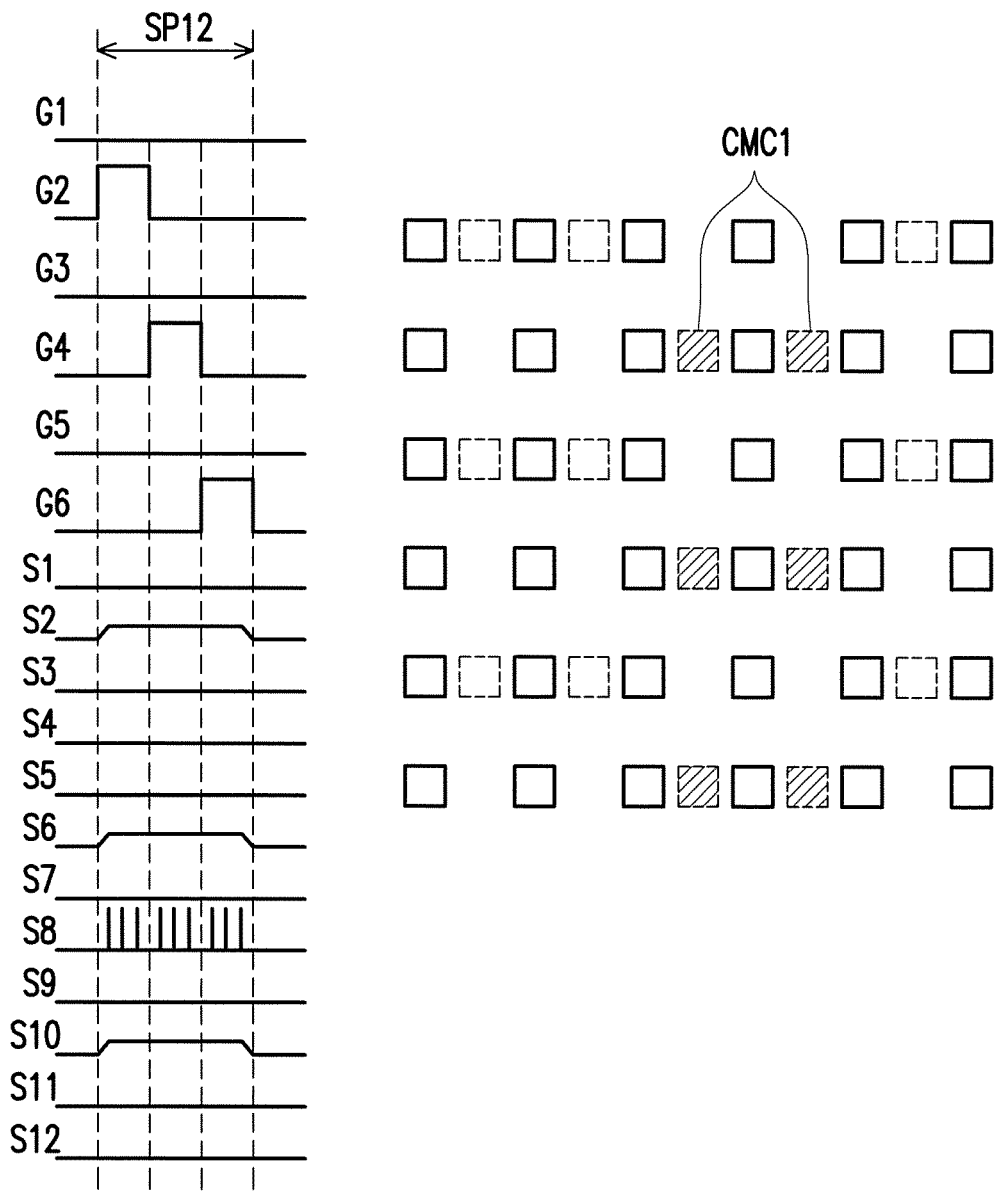

With reference to FIG. 1 and FIG. 3C, in a second sub-sensing period SP12 of the first mutual capacitance sensing period, the even-numbered gate signals G2, G4, and G6 that are sequentially enabled are provided by the row scan driver 120, so as to turn on the sensing pixels SPX row by row in even-numbered rows. Driving pulses (i.e., driving signals) are formed on the source signal S8 by the column scan driver 130, so as to feed the driving signals in the turned-on first transmission electrode pixels. Here, the source signal S8 is received by the turned-on first transmission electrode pixels, i.e., the $(4+4 \times n)^{th}$ sensing pixels in the even-numbered rows. The column scan driver 130 receives the source signals S2, S6, and S10, so as to obtain parts of first mutual capacitances CMC1 (as shown by the dotted blocks filled with diagonal lines on the right of FIG. 3C) from the sensing pixels SPX that are directly adjacent to the first transmission electrode pixels and located in the even-numbered rows. That is, the mutual capacitances of the driven first transmission electrode pixels and the sensing pixels SPX in the horizontal direction are obtained.

Figure 3D:
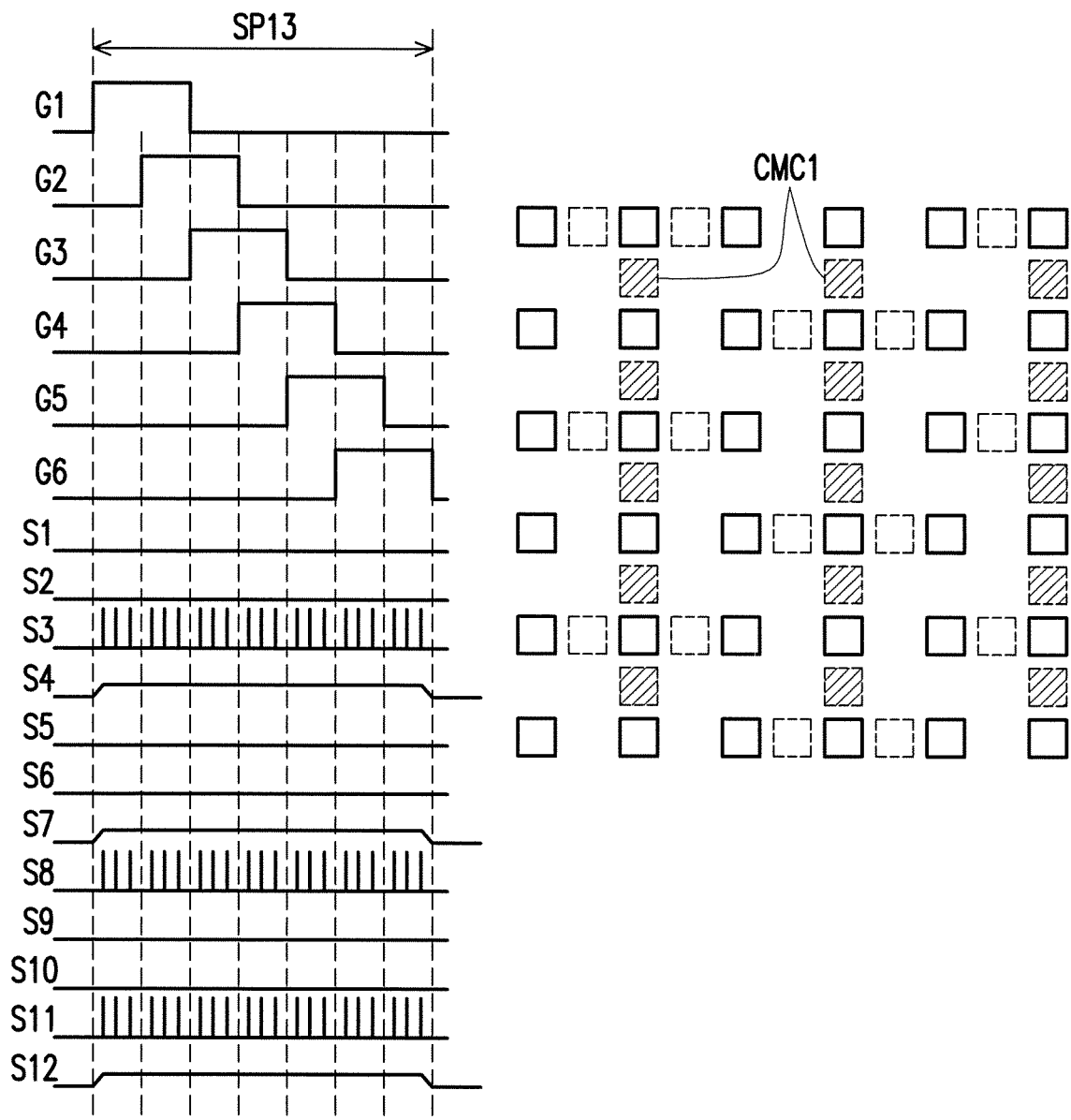

With reference to FIG. 1 and FIG. 3D, in a third sub-sensing period SP13 of the first mutual capacitance sensing period, the gate signals G1-G6 that are sequentially enabled are provided by the row scan driver 120, so as to turn on the sensing pixels SPX in two rows sequentially, wherein there is one overlapping horizontal scan period between every two of the gate signals G1-G6. Driving pulses (i.e., driving signals) are formed on the source signals S3, S8, and S11 by the column scan driver 130. Here, the source signals S3, S8, and S11 are received by the turned-on first transmission electrode pixels, i.e., the $(2+4 \times n)^{th}$ sensing pixels in the odd-numbered rows and the $(4+4 \times n)^{th}$ sensing pixels in the even-numbered rows. The column scan driver 130 receives the source signals S4, S7, and S12, so as to obtain parts of first mutual capacitances CMC1 (as shown by the dotted blocks filled with diagonal lines on the right of FIG. 3D) from the sensing pixels SPX that are directly adjacent to the first transmission electrode pixels but located in the rows different from the rows where the turned-on first transmission electrode pixels are located. That is, the mutual capacitances of the driven first transmission electrode pixels and the sensing pixels SPX in the vertical direction are obtained.

Figure 3E:
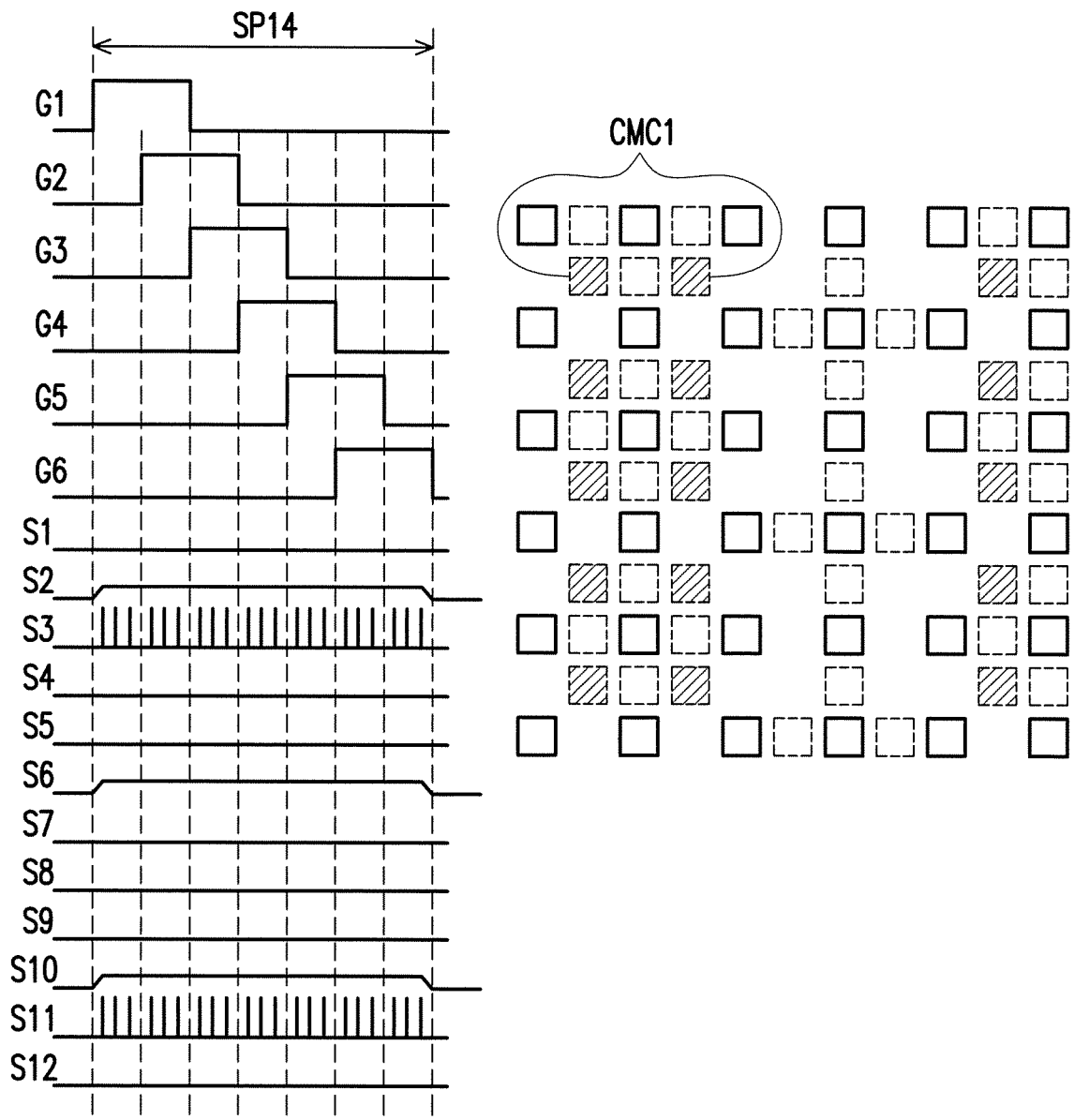

With reference to FIG. 1 and FIG. 3E, in a fourth sub-sensing period SP14 of the first mutual capacitance sensing period, the gate signals G1-G6 that are sequentially enabled are provided by the row scan driver 120, so as to turn on the sensing pixels SPX in two rows sequentially, wherein there is one overlapping horizontal scan period between every two of the gate signals G1-G6. Driving pulses (i.e., driving signals) are formed on the source signals S3 and S11 by the column scan driver 130, so as to feed the driving signals in the turned-on first transmission electrode pixels in the odd-numbered rows. Here, the source signals S3 and S11 are received by the turned-on first transmission electrode pixels, i.e., the $(2+4\times n)^{th}$ sensing pixels in the odd-numbered rows. The column scan driver 130 receives the source signals S2, S6, and S10, so as to obtain parts of first mutual capacitances CMC1 (as shown by the dotted blocks filled with diagonal lines on the right of FIG. 3E) from the sensing pixels SPX that are diagonally adjacent to the first transmission electrode pixels. That is, the mutual capacitances of the driven first transmission electrode pixels and the sensing pixels SPX in the diagonal direction are obtained.

Figure 3F:
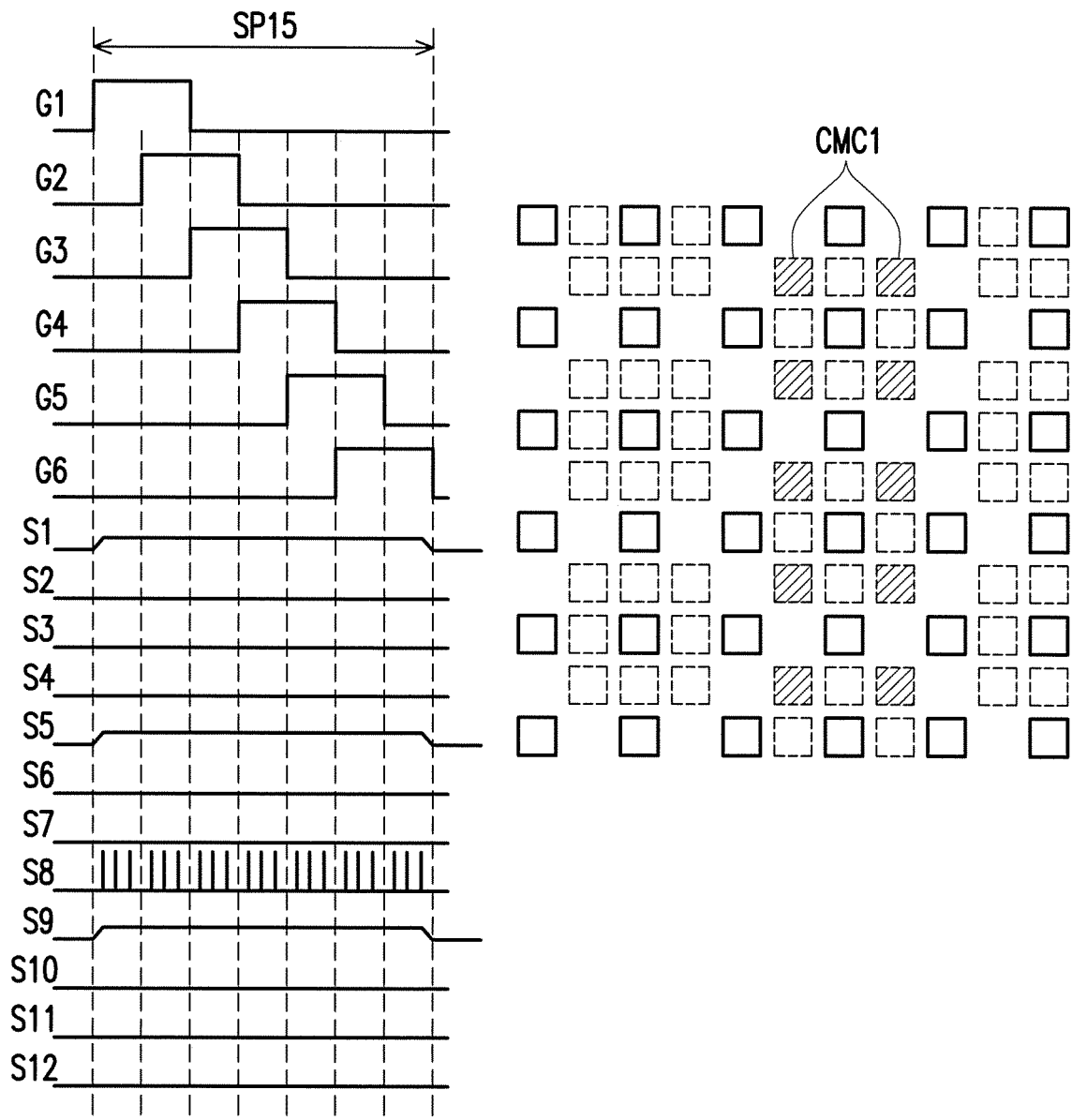

With reference to FIG. 1 and FIG. 3F, in a fifth sub-sensing period SP15 of the first mutual capacitance sensing period, the gate signals G1-G6 that are sequentially enabled are provided by the row scan driver 120, so as to turn on the sensing pixels SPX in two rows sequentially, wherein there is one overlapping horizontal scan period between every two of the gate signals G1-G6. Driving pulses (i.e., driving signals) are formed on the source signal S8 by the column scan driver 130, so as to feed the driving signals in the turned-on first transmission electrode pixels in the even-numbered rows. Here, the source signals S8 is received by the turned-on first transmission electrode pixels, i.e., the $(4+4\times n)^{th}$ sensing pixels in the even-numbered rows. The column scan driver 130 receives the source signals S1, S5, and S9, so as to obtain parts of first mutual capacitances CMC1 (as shown by the dotted blocks filled with diagonal lines on the right of FIG. 3F) from the sensing pixels SPX that are diagonally adjacent to the first transmission electrode pixels. That is, the mutual capacitances of the driven first transmission electrode pixels and the sensing pixels SPX in the diagonal direction are obtained.

Figure 4A:
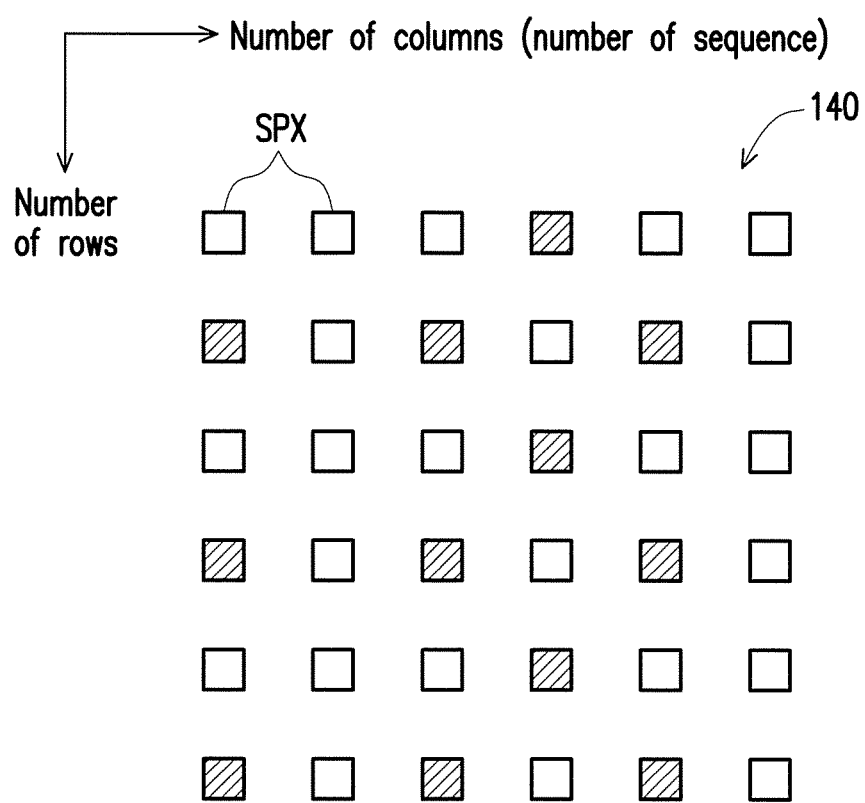
FIG. 4A to FIG. 4E are schematic views illustrating mutual capacitance sensing by a fingerprint sensor in a second mutual capacitance sensing period.

FIG. 4A to FIG. 4E are schematic views illustrating mutual capacitance sensing by a fingerprint sensor in a second mutual capacitance sensing period. With reference to FIG. 1 and FIG. 4A, in the present embodiment, the sensing pixel array 140 is observed from its upper-left corner as the reference point, and the fourth sensing pixel SPX in odd-numbered rows and the first, the third, and the fifth sensing pixels SPX in even-numbered rows (corresponding to the second part) are defined as the second transmission electrode pixels (as shown by blocks filled with diagonal lines). Broadly speaking, the $(4+4\times n)^{th}$ sensing pixels in odd-numbered rows and odd-numbered sensing pixels in even-numbered rows serve as the second transmission electrode pixels, wherein n is an integer greater than or equal to zero.

Figure 4B:
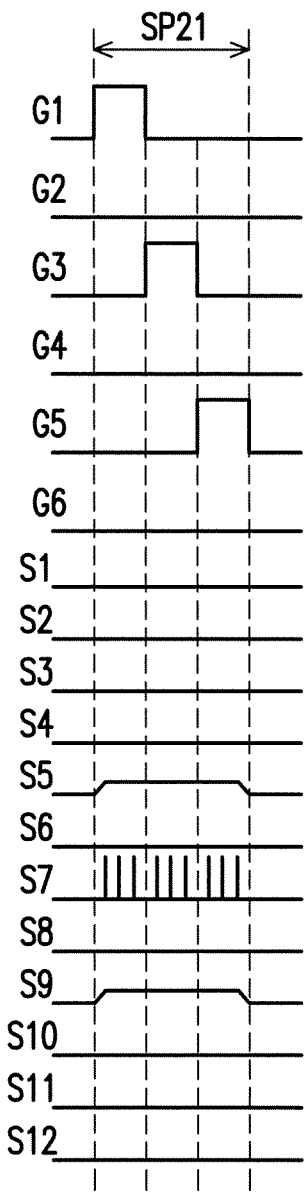
Figure 4B:
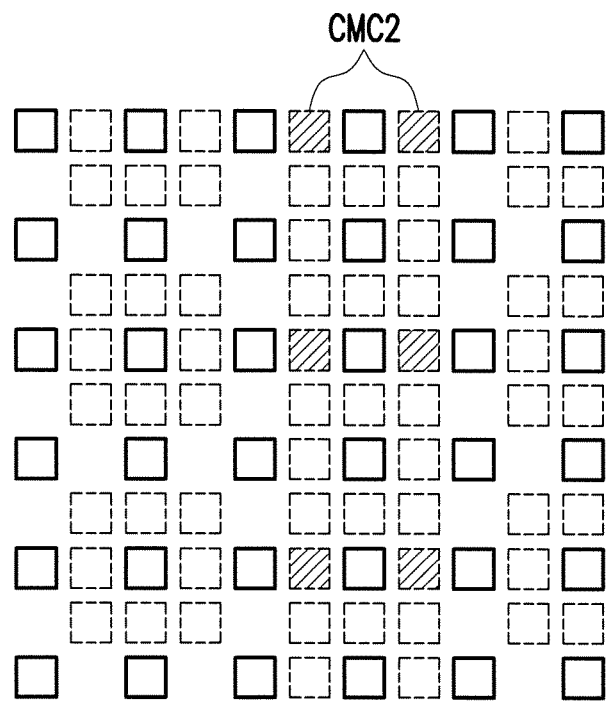

With reference to FIG. 1 and FIG. 4B, in a first sub-sensing period SP21 of the second mutual capacitance sensing period, the odd-numbered gate signals G1, G3, and G5 that are sequentially enabled are provided by the row scan driver 120, so as to turn on the sensing pixels SPX odd-numbered rows row by row. Driving pulses (i.e., driving signals) are formed on the source signal S7 by the column scan driver 130, so as to feed the driving signals in the turned-on second transmission electrode pixels. Here, the source signal S7 is received by the turned-on second transmission electrode pixels, i.e., the $(4+4\times n)^{th}$ sensing pixels in the odd-numbered rows. The column scan driver 130 receives the source signals S5 and S9, so as to obtain parts of second mutual capacitances CMC2 (as shown by the dotted blocks filled with diagonal lines on the right of FIG. 4B) from the sensing pixels SPX that are directly adjacent to the second transmission electrode pixels and located in odd-numbered rows. That is, the mutual capacitances of the driven second transmission electrode pixels and the sensing pixels SPX in the horizontal direction are obtained.

Figure 4C:
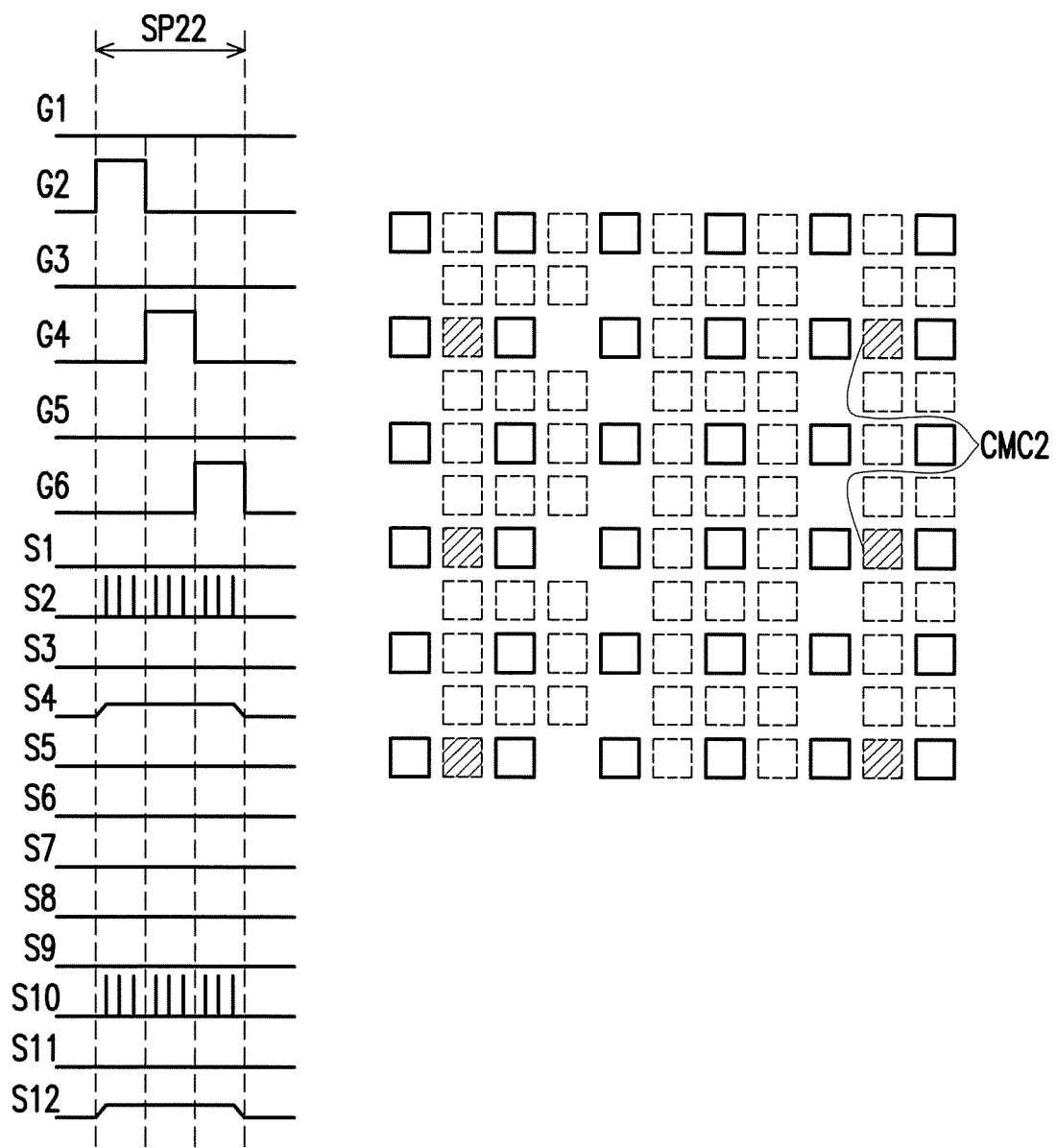

With reference to FIG. 1 and FIG. 4C, in a second sub-sensing period SP22 of the second mutual capacitance sensing period, the even-numbered gate signals G2, G4, and G6 that are sequentially enabled are provided by the row scan driver 120, so as to turn on the sensing pixels SPX in even-numbered rows row by row. Driving pulses (i.e., driving signals) are formed on the source signals S2 and S10 by the column scan driver 130, so as to feed the driving signals in the turned-on first and fifth sensing pixels SPX. i.e., the $(1+4\times n)^{th}$ sensing pixels in the even-numbered rows. Here, the source signals S2 and S10 are received by the turned-on second transmission electrode pixels, i.e., the odd-numbered sensing pixels in the even-numbered rows. The column scan driver 130 receives the source signals S4 and S12, so as to obtain parts of second mutual capacitances CMC2 (as shown by the dotted blocks filled with diagonal lines on the right of FIG. 4C) from the sensing pixels SPX that are directly adjacent to the right side (i.e., the first side) of the second transmission electrode pixels (where the driving signals are fed) and located in the even-numbered rows. That is, the mutual capacitances of the driven second transmission electrode pixels and the sensing pixels SPX on the right side are obtained.

Figure 4D:
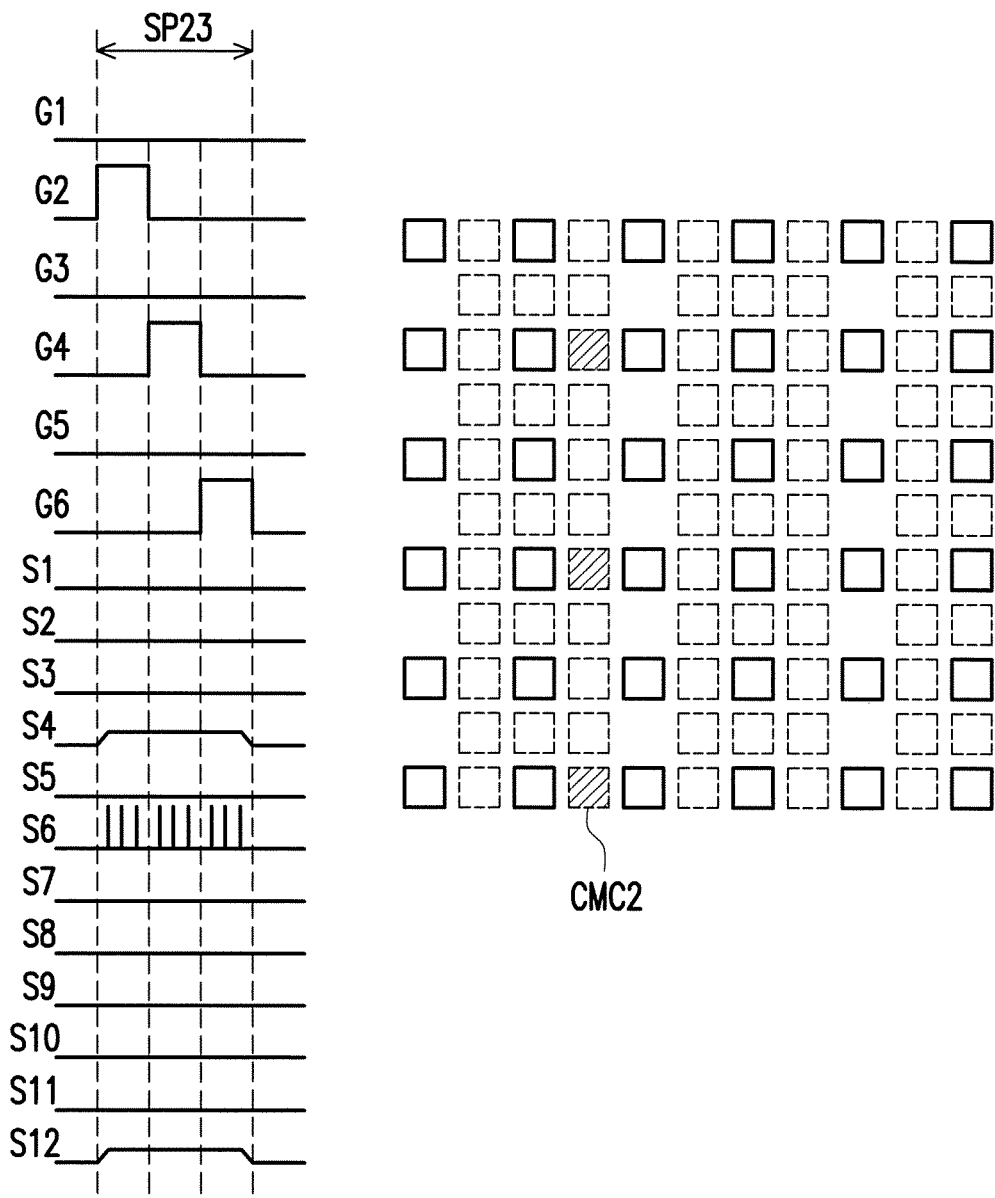

With reference to FIG. 1 and FIG. 4D, in a third sub-sensing period SP23 of the second mutual capacitance sensing period, the even-numbered gate signals G2, G4, and G6 that are sequentially enabled are provided by the row scan driver 120, so as to turn on the sensing pixels SPX row by row in the even-numbered rows. Driving pulses (i.e., driving signals) are formed on the source signal S6 by the column scan driver 130, so as to feed the driving signals in the turned-on third sensing pixels SPX. i.e., the $(3+4\times n)^{th}$ sensing pixels in the even-numbered rows. Here, the source signal S6 is received by the turned-on second transmission electrode pixels, i.e., the odd-numbered sensing pixels in the even-numbered rows. The column scan driver 130 receives the source signals S4 and S12, so as to obtain parts of second mutual capacitances CMC2 (as shown by the dotted blocks filled with diagonal lines on the right of FIG. 4D) from the sensing pixels SPX that are directly adjacent to the left side (i.e., the second side) of the second transmission electrode pixels (where the driving signals are fed) and located in the even-numbered rows. That is, the mutual capacitances of the driven second transmission electrode pixels and the sensing pixels SPX on the left side are obtained.

Figure 4E:
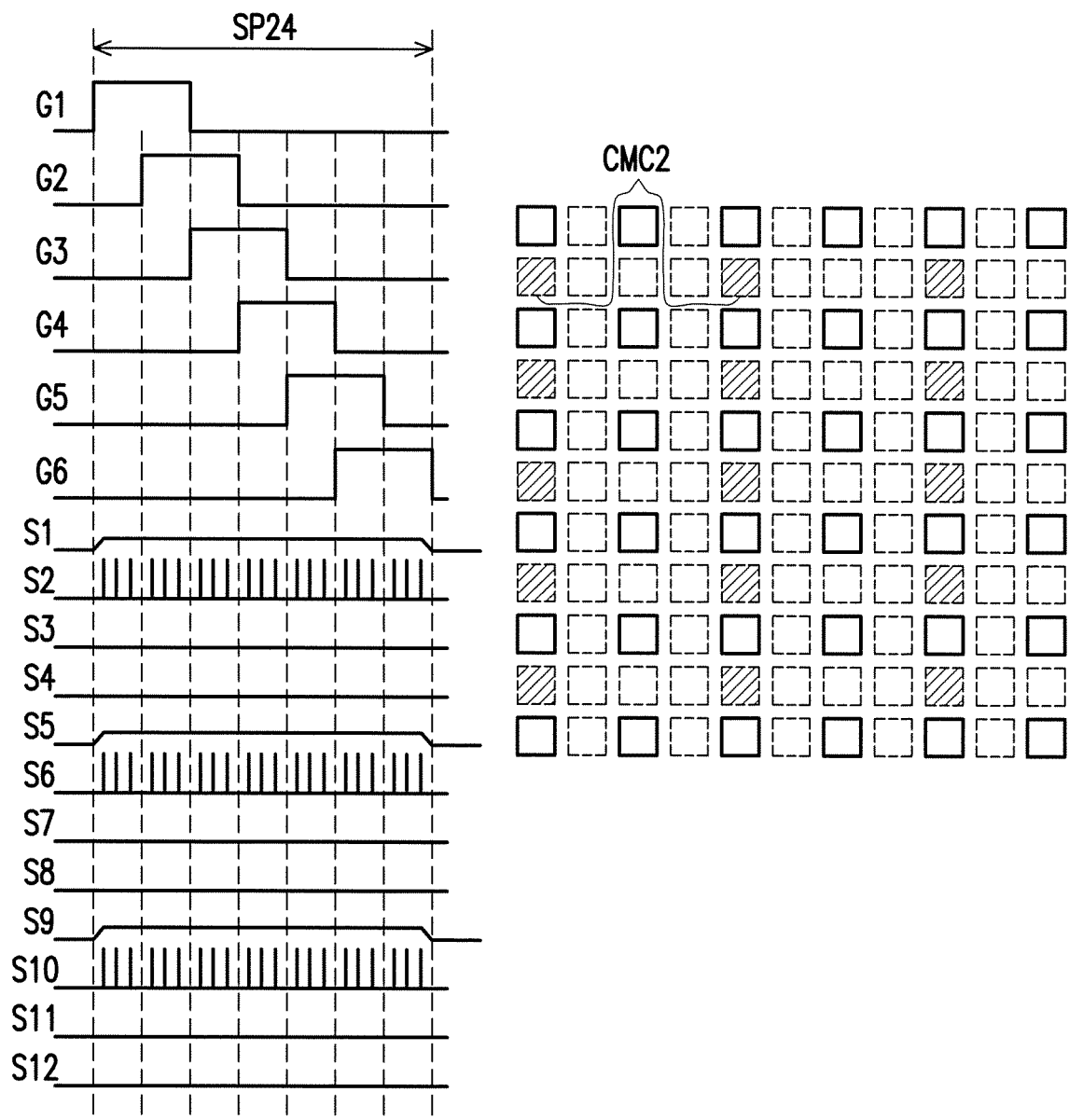

With reference to FIG. 11 and FIG. 4E, in a fourth sub-sensing period SP24 of the second mutual capacitance sensing period, the gate signals G1-G6 that are sequentially enabled are provided by the row scan driver 120, so as to turn on the sensing pixels SPX in two rows sequentially, wherein there is one overlapping horizontal scan period between every two of the gate signals G1-G6. Driving pulses (i.e., driving signals) are formed on the source signals S2, S6, and S10 by the column scan driver 130. Here, the source signals S2, S6, and S10 are received by the turned-on second transmission electrode pixels, i.e., the odd-numbered sensing pixels in the even-numbered rows. The column scan driver 130 receives the source signals S1, S5, and S9, so as to obtain parts of second mutual capacitances CMC2 (as shown by the dotted blocks filled with diagonal lines on the right of FIG. 4D) from the sensing pixels SPX that are directly adjacent to the turned-on second transmission electrode pixels but located in the rows different from the rows where the turned-on second transmission electrode pixels are located. That is, the mutual capacitances of the driven second transmission electrode pixels and the sensing pixels SPX in the vertical direction are obtained.

Here, the self-capacitances CSC (i.e., the solid blocks) of the sensing pixels SPX correspond to the locations of the sensing pixels SPX, and the first mutual capacitances CMC1 and the second mutual capacitances CMC2 (i.e., the dotted blocks) of the sensing pixels SPX correspond to the locations between the sensing pixels SPX. That is, the self-capacitances CSC, the first mutual capacitances CMC1, and the second mutual capacitances CMC2 of the sensing pixels SPX correspond to different sensing locations. The combination of the self-capacitances CSC, the first mutual capacitances CMC1, and the second mutual capacitances CMC2 of all sensing pixels SPX may serve as the second fingerprint pattern PF2. Besides, as provided above, parts of the sensing pixels SPX are defined as the first transmission electrode pixels and the second transmission electrode pixels; that is, the sum of the first and second parts of the sensing pixels SPX is less than the total number of the sensing pixels SPX.

In light of the embodiments depicted in FIG. 3A to FIG. 3F and FIG. 4A to FIG. 4D, following steps are executed while the mutual capacitance sensing of the sensing pixels SPX is performed. In the first mutual capacitance sensing period (i.e., the sub-sensing periods SP11 to SP15), the first part of the sensing pixels SPX is defined as a plurality of first transmission electrode pixels. The first transmission electrode pixels are then turned on row by row to feed in a driving signal, and the mutual capacitance sensing is performed on the sensing pixels SPX adjacent to the turned-on first transmission electrode pixels to obtain a plurality of first mutual capacitances CMC1. In the second mutual capacitance sensing period (i.e., the sub-sensing periods SP21-SP24), the second part of the sensing pixels SPX is defined as a plurality of second transmission electrode pixels, wherein the second part is different from the first part. The second transmission electrode pixels are then turned on row by row to feed in the driving signal, and the mutual capacitance sensing is performed on the sensing pixels SPX adjacent to the turned-on second transmission electrode pixels to obtain a plurality of second mutual capacitances CMC2.

In the previous embodiments, the sub-sensing periods SP11-SP15 and SP21-SP24 are explained sequentially with reference to the drawings for better understanding; however, in another embodiment, said steps may all be performed in a different order in the sub-sensing periods SP11-SP15 and SP21-SP24, and the disclosure should not be limited thereto. Besides, in the sub-sensing periods SP11-SP15 and SP21-SP24, the sensing pixels SPX in each row are turned on for at most two horizontal scan periods, so as to prevent electric charges from being accumulated and avoid the accumulated electric charges from affecting the result of mutual capacitance sensing.

Figure 5:
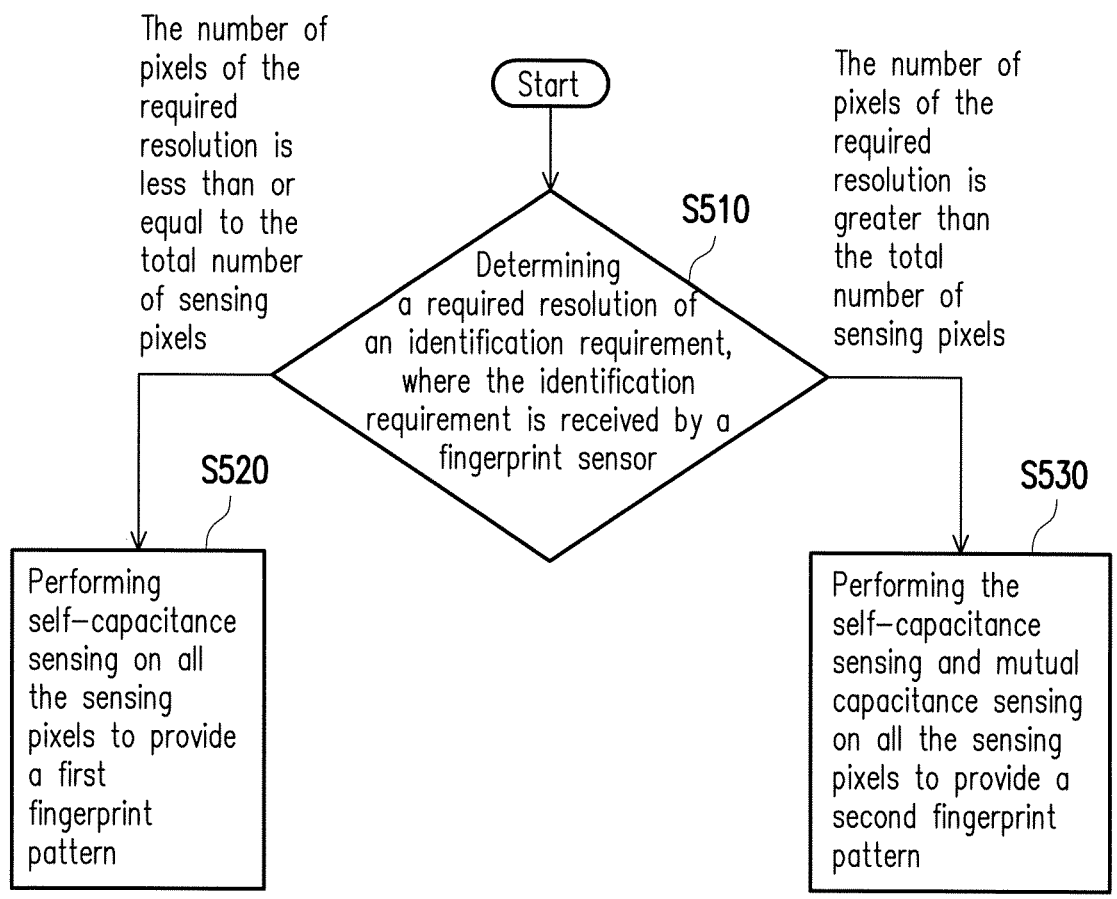
FIG. 5 is a flowchart of a sensing method of a fingerprint sensor according to an embodiment of the disclosure.

FIG. 5 is a flowchart of a sensing method of a fingerprint sensor according to an embodiment of the disclosure. With reference to FIG. 5, in the present embodiment, the fingerprint sensor includes a plurality of sensing pixels arranged in an array, and the sensing pixels respectively have a sensing electrode. The sensing method of the fingerprint sensor includes following steps. In step S510, a required resolution of an identification requirement is determined; here, the identification requirement is received by the fingerprint sensor. If the number of pixels of the required resolution is less than or equal to the total number of the sensing pixels, self-capacitance sensing is performed on the sensing pixels to provide a first fingerprint pattern (step S520); if the number of pixels of the required resolution is greater than the total number of the sensing pixels, the self-capacitance sensing and mutual capacitance sensing are performed on all the sensing pixels to provide a second fingerprint pattern (step S530). It is noted that the order of steps S510, S520, and S530 as described above is for illustrative purposes and should not be construed as a limitation to the embodiments of the disclosure. Details of steps S510, S520, and S530 have been specified in the embodiments depicted in FIG. 1, FIG. 2, FIG. 3A to FIG. 3F, and FIG. 4A to FIG. 4E and therefore are not further described.

To sum up, in the sensing method of the fingerprint sensor provided in the embodiments of the disclosure, whether to perform the self-capacitance sensing on the sensing pixels of the fingerprint sensor or perform the self-capacitance sensing and the mutual capacitance sensing sequentially may be determined according to the required resolution of the identification requirement, so as to adjust the scan time of the fingerprint sensor according to the identification requirement. Thereby, the scan time and the power consumption of the fingerprint sensor can be reduced while the identification requirement is satisfied. Besides, in the sub-sensing periods, the sensing pixels in each row are turned on for at most two horizontal scan periods, so as to prevent electric charges from being accumulated and avoid the accumulated electric charges from affecting the result of mutual capacitance sensing.

It will be apparent to those skilled in the art that various modifications and variations can be made to the disclosed embodiments without departing from the scope or spirit of the disclosure. In view of the foregoing, it should be mentioned that the disclosure covers modifications and variations of this disclosure provided that they fall within the scope of the following claims and their equivalents.

What is claimed is:

1. A sensing method of a fingerprint sensor, the fingerprint sensor comprising a plurality of sensing pixels arranged in an array, the sensing pixels respectively having a sensing electrode, the sensing method comprising:
    determining a required resolution of an identification requirement, wherein the identification requirement is received by the fingerprint sensor;
    performing self-capacitance sensing on the sensing pixels to provide a first fingerprint pattern if a number of pixels of the required resolution is less than or equal to a number of the sensing pixels; and
    performing the self-capacitance sensing and mutual capacitance sensing on the sensing pixels to provide a second fingerprint pattern if the number of pixels of the required resolution is greater than the number of the sensing pixels.

2. The sensing method according to claim 1, wherein the step of performing the self-capacitance sensing comprises:
    turning on the sensing pixels row by row; and performing the self-capacitance sensing on the sensing electrode of the turned-on sensing pixels to obtain a plurality of self-capacitances of the sensing pixels.

3. The sensing method according to claim 2, wherein the step of performing the mutual capacitance sensing comprises:
defining a first part of the sensing pixels as a plurality of first transmission electrode pixels in a first mutual capacitance sensing period;
turning on the first transmission electrode pixels row by row to feed in a driving signal and performing the mutual capacitance sensing on the sensing pixels adjacent to the turned-on first transmission electrode pixels to obtain a plurality of first mutual capacitances;
defining a second part of the sensing pixels as a plurality of second transmission electrode pixels in a second mutual capacitance sensing period, wherein the second part is different from the first part; and
turning on the second transmission electrode pixels row by row to feed in the driving signal and performing the mutual capacitance sensing on the sensing pixels adjacent to the turned-on second transmission electrode pixels to obtain a plurality of second mutual capacitances.

4. The sensing method according to claim 3, wherein the self-capacitances, the first mutual capacitances, and the second mutual capacitances correspond to different sensing locations.

5. The sensing method according to claim 3, wherein the first fingerprint pattern is constituted by the self-capacitances, and the second fingerprint pattern is constituted by the self-capacitances, the first mutual capacitances, and the second mutual capacitances.

6. The sensing method according to claim 3, wherein a sum of the first part and the second part is less than a sum of the sensing pixels.

7. The sensing method according to claim 3, wherein the first transmission electrode pixels are $(2+4 \times n)^{th}$ sensing pixels in odd-numbered rows and $(4+4 \times n)^{th}$ sensing pixels in even-numbered rows, and n is an integer greater than or equal to zero.

8. The sensing method according to claim 7, further comprising:
in a first sub-sensing period of the first mutual capacitance sensing period, turning on the sensing pixels in the odd-numbered rows row by row and feeding the driving signal in the turned-on first transmission electrode pixels to obtain the first mutual capacitances from the sensing pixels directly adjacent to the turned-on first transmission electrode pixels in the odd-numbered rows;
in a second sub-sensing period of the first mutual capacitance sensing period, turning on the sensing pixels in the even-numbered rows row by row and feeding the driving signal in the turned-on first transmission electrode pixels to obtain the first mutual capacitances from the sensing pixels directly adjacent to the turned-on first transmission electrode pixels in the even-numbered rows;
in a third sub-sensing period of the first mutual capacitance sensing period, turning on the sensing pixels in two rows sequentially and feeding the driving signal in the turned-on first transmission electrode pixels to obtain the first mutual capacitances from the sensing pixels directly adjacent to the turned-on first transmission electrode pixels but located in the rows different from the rows where the turned-on first transmission electrode pixels are located;
in a fourth sub-sensing period of the first mutual capacitance sensing period, turning on the sensing pixels in two rows sequentially and feeding the driving signal in the turned-on first transmission electrode pixels in the odd-numbered rows to obtain the first mutual capacitances from the sensing pixels diagonally adjacent to the first transmission electrode pixels; and
in a fifth sub-sensing period of the first mutual capacitance sensing period, turning on the sensing pixels in two rows sequentially and feeding the driving signal in the turned-on first transmission electrode pixels in the even-numbered rows to obtain the first mutual capacitances from the sensing pixels diagonally adjacent to the first transmission electrode pixels.

9. The sensing method according to claim 3, wherein the second transmission electrode pixels are $(4+4 \times n)^{th}$ sensing pixels in odd-numbered rows and odd-numbered sensing pixels in even-numbered rows, n is an integer greater than or equal to zero.

10. The sensing method according to claim 9, further comprising:
in a first sub-sensing period of the second mutual capacitance sensing period, turning on the sensing pixels in the odd-numbered rows row by row and feeding the driving signal in the turned-on second transmission electrode pixels to obtain the second mutual capacitances from the sensing pixels directly adjacent to the second transmission electrode pixels in the odd-numbered rows;
in a second sub-sensing period of the second mutual capacitance sensing period, turning on the sensing pixels in the even-numbered rows row by row and feeding the driving signal in the turned-on $(1+4 \times n)^{th}$ sensing pixels to obtain the second mutual capacitances from the sensing pixels directly adjacent to a first side of the turned-on second transmission electrode pixels in the even-numbered rows;
in a third sub-sensing period of the second mutual capacitance sensing period, turning on the sensing pixels in the even-numbered rows row by row and feeding the driving signal in the turned-on $(3+4 \times n)^{th}$ sensing pixels to obtain the second mutual capacitances from the sensing pixels directly adjacent to a second side of the turned-on second transmission electrode pixels in the even-numbered rows, wherein the second side is opposite to the first side; and
in a fourth sub-sensing period of the second mutual capacitance sensing period, turning on the sensing pixels in two rows sequentially and feeding the driving signal in the turned-on second transmission electrode pixels in the even-numbered rows to obtain the second mutual capacitances from the sensing pixels directly adjacent to the second transmission electrode pixels but in the rows different from the rows where the turned-on second transmission electrode pixels are located.

11. The sensing method according to claim 9, wherein a resolution of the first fingerprint pattern is equal to the number of the sensing pixels, and a resolution of the second fingerprint pattern is greater than the number of the sensing pixels.

* * * * *